(12) United States Patent
Ceresoli et al.

(10) Patent No.: US 10,384,916 B2
(45) Date of Patent: Aug. 20, 2019

(54) DEVICE FOR SUPPORTING A CABLE OF A CAPSTAN OF A CRANE

(71) Applicant: O.ME.FA S.p.A. Officina Meccanica Fassi, Albino (BG) (IT)

(72) Inventors: Rossano Ceresoli, Ranica (IT); Ivan Maffeis, Stezzano (IT); Roberto Signori, Albino (IT)

(73) Assignee: O.ME.FA S.p.A. Officina Meccanica Fassi, Albino (BG) (IT)

( * ) Notice: Subject to any disclaimer, the term of this patent is extended or adjusted under 35 U.S.C. 154(b) by 85 days.

(21) Appl. No.: 15/718,011

(22) Filed: Sep. 28, 2017

(65) Prior Publication Data

US 2018/0118525 A1 May 3, 2018

(30) Foreign Application Priority Data

Oct. 27, 2016 (IT) .............................. MI2016A8686

(51) Int. Cl.
*B66C 23/66* (2006.01)
*B66C 13/16* (2006.01)
(Continued)

(52) U.S. Cl.
CPC .............. *B66C 23/66* (2013.01); *B66C 13/16* (2013.01); *B66C 13/46* (2013.01); *B66C 23/54* (2013.01);
(Continued)

(58) Field of Classification Search
CPC ....... B66C 23/66; B66C 23/54; B66C 23/701; B66C 13/16; B66C 13/46; B66D 1/36;
(Continued)

(56) References Cited

U.S. PATENT DOCUMENTS 3,883,859 A * 5/1975 Ancheta .................. B66C 13/46
212/282
5,071,184 A * 12/1991 Dessaux ............... B66C 13/085
294/82.15
(Continued)

FOREIGN PATENT DOCUMENTS

EP           1172322 A1 *   1/2002   ............ B66C 13/14
EP           1510497 A1     3/2005
KR       20130015049 A      2/2013

OTHER PUBLICATIONS

Search Report & Written Opinion in IT201600108686 dated Jun. 20, 2017.

*Primary Examiner* — Michael E Gallion
(74) *Attorney, Agent, or Firm* — Manelli Selter PLLC; Edward J. Stemberger

(57) ABSTRACT

A device for supporting a cable of a capstan of a crane includes a main supporting structure; a pulley rotatably supported by the main supporting structure, adapted to guide the cable of the capstan; and a sensor for measuring the angular position of the pulley. The pulley includes an auxiliary crown having a plurality of projecting elements disposed along the circumference thereof, and the sensor includes a stationary body integral with the main supporting structure and a wheel rotatable with respect to the stationary body, including a deformable crown meshing with the auxiliary crown of the pulley and made of a material such to deform due to the engagement of the projecting elements, wherein the sensor further includes means for detecting the angular position of the wheel with respect to the stationary body of the sensor.

8 Claims, 3 Drawing Sheets

(51) Int. Cl.
*B66D 1/36* (2006.01)
*G01D 5/12* (2006.01)
*B66C 13/46* (2006.01)
*B66C 23/00* (2006.01)
*B66D 1/54* (2006.01)
B66C 23/70 (2006.01)
G01D 5/14 (2006.01)

(52) U.S. Cl.
CPC ................. *B66D 1/36* (2013.01); *B66D 1/54* (2013.01); *G01D 5/12* (2013.01); *B66C 23/701* (2013.01); *B66D 2700/026* (2013.01); *G01D 5/145* (2013.01)

(58) Field of Classification Search
CPC ...... B66D 1/54; B66D 2700/026; G01D 5/12; G01D 5/145
See application file for complete search history.

(56) References Cited

U.S. PATENT DOCUMENTS

| | | | |
|---|---|---|---|
| 6,269,547 B1* | 8/2001 | Chuang | B65H 75/4405 254/338 |
| 9,988,251 B2* | 6/2018 | Hall | B66D 1/38 |
| 2006/0249717 A1* | 11/2006 | Conti | B25J 17/0266 254/268 |
| 2011/0278905 A1* | 11/2011 | Ikeda | B60R 22/34 297/475 |
| 2014/0306050 A1* | 10/2014 | Ito | B60R 22/40 242/370 |
| 2016/0236918 A1* | 8/2016 | Hall | B66D 1/38 |
| 2017/0081154 A1* | 3/2017 | Vierkotten | B66C 23/54 |

* cited by examiner

DEVICE FOR SUPPORTING A CABLE OF A CAPSTAN OF A CRANE

TECHNICAL FIELD

The present invention refers to a device for supporting a cable of a capstan of a crane, particularly a supporting device for measuring the unwinding of the cable of the capstan.

PRIOR ART

Cranes equipped with a capstan, in other words with a system enabling to wind and unwind a cable for raising and lowering a hook disposed at the end of an extendable arm thereof, are known. The hook can support a load.

Due to the movement of the extensions of the crane arm, and therefore due to the consequent lengthening or shortening, without any action on the cable of the capstan, this one goes up or down. Consequently, the distance between the hook of the capstan and the end of the arm of the crane changes.

Therefore, it is known to measure the rotations of a sheave supporting the cable of the capstan, placed at the end of the crane arm. Indeed, also without movements of the capstan caused by the movement of the extensions, such sheave performs rotations due to the ascent and descent of the capstan cable which slides along the periphery thereof by rotating it. Therefore, by measuring such rotations it is possible to offset the ascent/descent of the cable, due to the movement of the extensions by unwinding/winding the cable of an amount equal to the one obtainable by the rotations of the pulley at the end of the arm.

SUMMARY

It is the object of the present invention to provide a device which enables the previously described compensation of the ascent/descent of the cable of the capstan, caused by lengthening/shortening the telescoping arms, which can be easily applied to an existent crane, which is structurally simple and exhibits an easy maintenance.

This and other objects are obtained by a device for supporting a cable of a capstan of a crane according to claim 1.

The dependent claims define possible advantageous embodiments of the invention.

BRIEF DESCRIPTION OF THE DRAWINGS

For a better comprehension of the invention and appreciating the advantages thereof, some exemplifying non-limiting embodiments thereof will be described in the following with reference to the attached drawings, wherein.

DETAILED DESCRIPTION OF EXEMPLARY EMBODIMENTS

Figure 1:
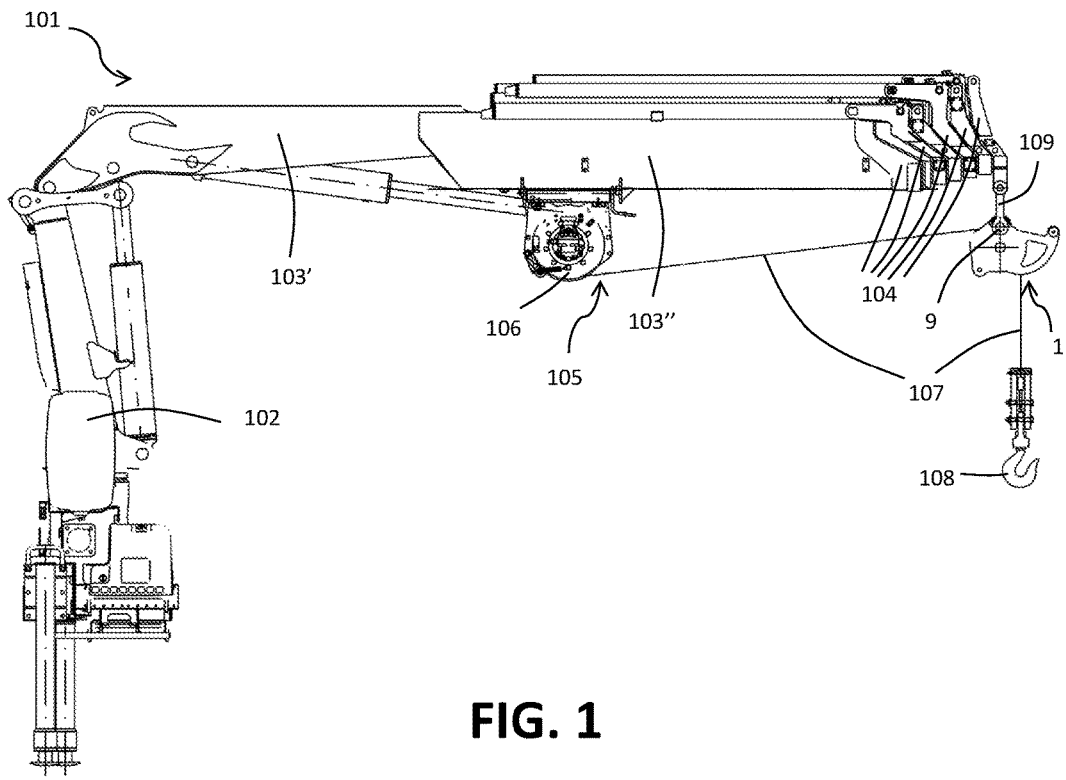
FIG. 1 is a side view of a crane provided with a device for supporting a cable of a capstan, according to a possible embodiment of the invention.
Figure 2:
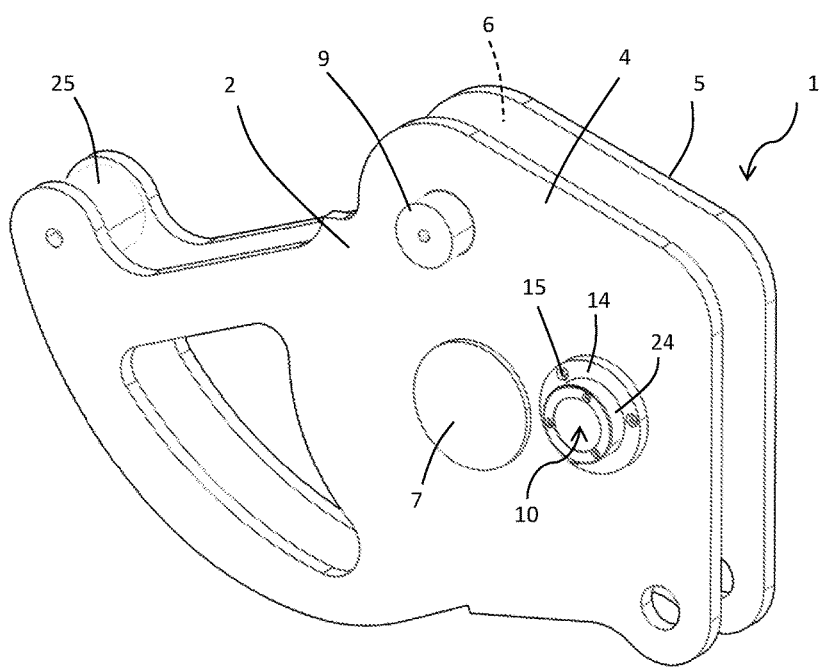
FIG. 2 is a perspective view of a device for supporting a cable of a capstan of a crane, according to a possible embodiment of the invention.
Figure 3:
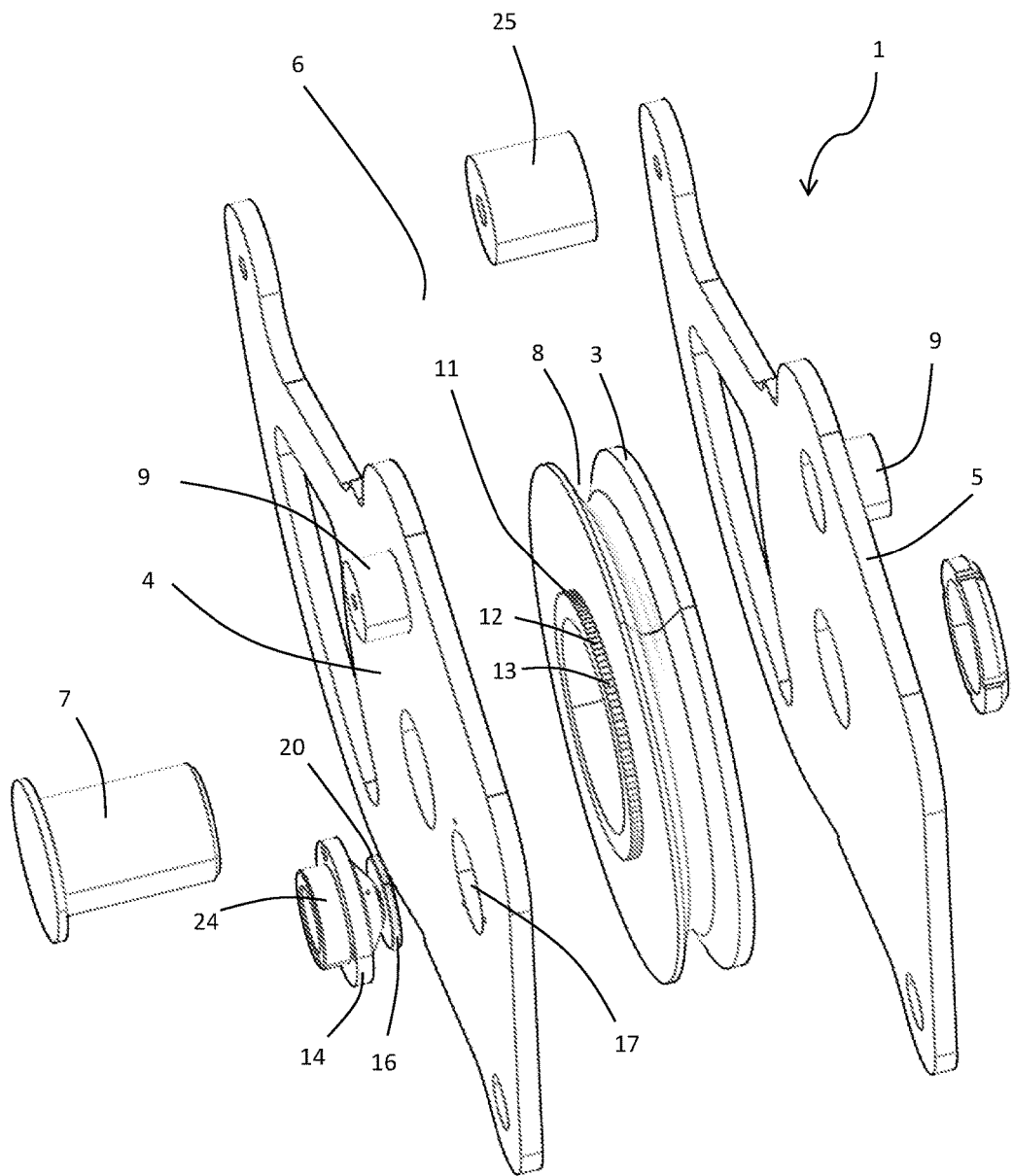
FIG. 3 is a perspective exploded view of the device of FIG. 2.
Figure 4:
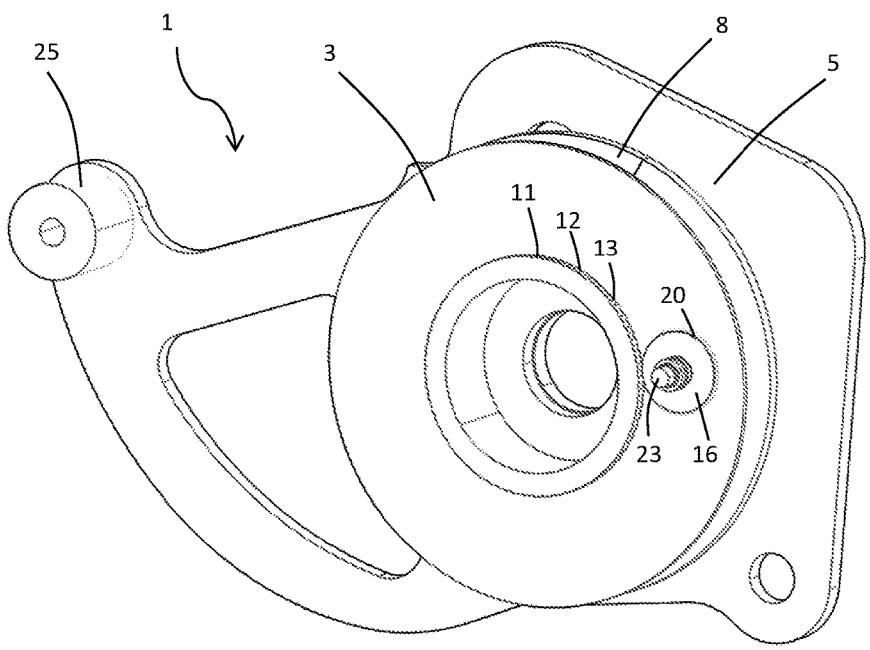
FIG. 4 is a perspective view of a portion of the device of FIG. 2.
Figure 5:
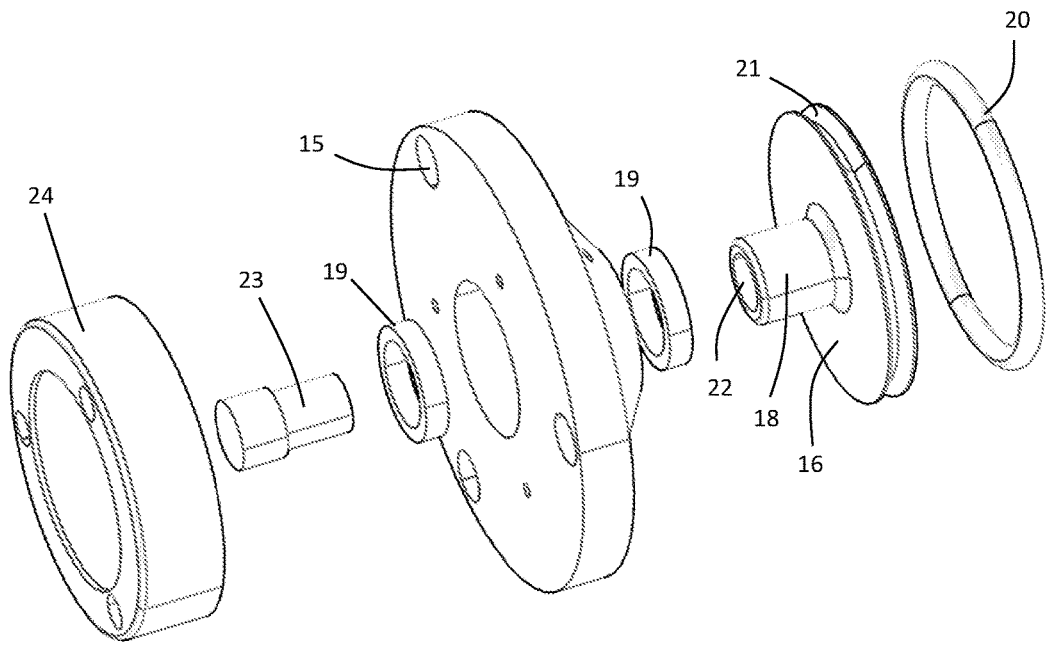
FIG. 5 is an exploded perspective view of a sensor of the device of a supporting a cable of a capstan, according to a possible embodiment.

Referring to the attached FIG. 1, reference 101 generally indicates a crane, particularly a loader crane.

The crane 101 comprises a column 102 rotatable about the axis thereof, and one or more possibly extendable arms 103', 103". The possibility of extending the arms, if provided, is obtained by a plurality of extensions 104 translatingly movable from each other, operated by hydraulic actuators, so that it is possible to modify the axial extension of a respective arm. In the example in FIG. 1, only the second arm is extendable by moving the extensions 104.

A capstan 105 is associated to the crane 101. The capstan 105 comprises a driving pulley 106, actuated by a motor, and a cable 107 extending along all the length of the arms, to the end thereof a hook 108 or another device adapted to support loads can be connected. A device 1 supporting the cable 107 of the capstan 105 according to the invention is disposed at the end of the last arm 103".

Referring now to Figures from 2 to 5, the supporting device 1 comprises a main supporting structure 2 and a pulley 3 rotatably supported by the main supporting structure 2. The main supporting structure 2 can comprises a first 4 and second opposite plates 5 delimiting in between a space 6 receiving the pulley 3, connected to the plates 4, 5 themselves for example by a pin 7. According to a possible embodiment, a roll 25 is provided acting as a reinforcement of the main structure and further having the function of preventing the cable 107 of the capstan 105 from disengaging from the pulley 3 when the arm to which the device 1 is connected takes some orientations, for example when faces downwards.

The pulley 3 is a driven pulley having the function of supporting the cable 107 of the capstan 105 at the end of the last arm of the crane 101. Therefore, due to the movements of such cable 107, which drags the pulley 3 along the periphery thereof, the pulley 3 rotates with respect to the main supporting structure 2. In other words, the pulley 3 rolls with respect to the cable 107. For this reason, the pulley 3 can comprise a groove 8 adapted to receive such cable 107.

Advantageously, the main supporting structure 2 comprises connecting means at the end of the last arm of the crane. According to an embodiment, such means comprise a connecting arm 109, to be fixed to the crane arm. For example, with reference to the arrangement with the first 4 and second plates 5, also such arm can comprise a first and a second arms connected to supporting pins 9 provided in the first 4 and second plates 5 at an end, and connectable to the crane arm 103' to the opposite end.

The device 1 comprises a sensor 10 for measuring the angular position of the pulley 3 with respect to the main supporting structure 2. Due to the relationship with the extension of the cable 107 of the capstan 105, by measuring it, it is possible to obtain the other.

It will be now described the way to implement the sensor of the device according to the invention.

The pulley 3 comprises an auxiliary crown 11, preferably integrally made with the pulley 3 itself and concentric with it, in other words rotatable about the same rotation axis. The auxiliary crown 11 is axially projecting from the pulley 3 in order to form a circumferential surface 12. Such circumferential surface 12 exhibits a plurality of projecting elements 13. According to a possible embodiment, such projecting elements 13 are obtained by knurling the circumferential surface 12. The knurling is a particularly low-cost process, with respect to the implementation of toothed wheels, for example. Obviously, as an alternative, such projecting elements can be obtained by different machining processes, as can be understood by a person skilled in the art.

The sensor 10 comprises a stationary body 14 integral with the main supporting structure 2. According to a possible embodiment, such stationary body 14 is fixed, preferably laterally outwardly, to one between the first 4 and second plates 5 (to the first plate 4 in the example in the figures). For this reason, the stationary body 14 can comprise one or more holes 15 for inserting screws to be tighten in corresponding threaded seats of the first plate.

Moreover, the sensor 10 comprises a wheel 16 rotatable with respect to the stationary body 14, which meshes the auxiliary crown 11 of the pulley 8, so that a rotation of the pulley 8 corresponds to a rotation of the wheel 16 of the sensor 10. Preferably, this latter exhibits a diameter smaller than the diameter of the pulley 8 and therefore between the pulley 8 and the wheel 16 of the sensor 10 there is a transmission ratio different from 1, given by the ratio between the respective diameters. According to a possible embodiment, the wheel 16 of the sensor 10 is received in the space 6 delimited by the first 4 and second plates 5, wherein the pulley 8 is received. Advantageously, according to such embodiment, the first plate 4, on which the stationary body 14 of the sensor 10 is laterally outwardly applied, exhibits an opening 17 enabling to insert the wheel 16 of the sensor 10 into said space 6. Such opening 17 exhibits an extension, particularly a diameter, greater than the one of the wheel 16 of the sensor 10, and less than the one of the stationary body 14, which is positioned so that, in an assembled condition, the opening 17 is closed by the stationary body 14 itself.

In order to enable to rotate the wheel of the sensor 10 with respect to the stationary body 14, preferably the wheel 16 comprises a shaft 18 connected to the stationary body 14 by one or more bearings 19.

The wheel 16 of the sensor 10 comprises a circumferentially developing crown 20 and which forms the portion meshing the auxiliary crown 11 of the pulley 3, particularly by the projecting elements 13. Such crown 20 of the wheel 16 of the sensor 10 is made by a deformable material, in other words a material which deforms by the effect of the engagement with the projecting elements 13 which, due to the engagement, form, by deforming the crown 20 of the wheel 16 of the sensor 10, corresponding seats which prevent relative slippages. Obviously, as it is evident to a person skilled in the art, the term "deformation", in this case, does not mean a deformation having a limited amount, to which any material, such as a metal, is subjected due to a pressure, but means a macroscopic deformation obtained by using a naturally deformable yielding material. For example, such crown 20 can be made of an elastomeric material, such as rubber.

According to a possible embodiment, the deformable crown 20 of the wheel 16 of the sensor 10 can be removed from the wheel itself, which for this purpose can comprise a circumferential groove 21, for example, adapted to receive the deformable crown 20 itself. For example, the deformable crown 20 can comprise a removable O-ring. In this way, it is possible to simply substitute the deformable crown 20, for example when this latter is worn.

The sensor 10 comprises means for detecting the angular position of the wheel 16 of the sensor, with respect to the stationary body 14. In this way, by measuring such angular position, by knowing the previously cited transmission ratio, it is possible to obtain the angular position of the pulley 3 and, consequently, the prolongation of the cable 107 of the capstan 105 on the crane. It is observed that the term "angular position" can be understood both by an absolute meaning, and in a relative meaning, in other words can be referred to a reference origin, according to the type of the used detecting means, which can be of a different kind.

According to a possible embodiment, the shaft 18 of the wheel 16 of the sensor 10 comprises a cavity 22 in which a magnet 23 is inserted, this latter, when used, rotates integrally with the shaft 18 itself. The sensor 10 comprises a detecting probe 24, connectable for example to the stationary body 14, configured for detecting the angular position of the magnet 23, and consequently of the wheel 16 of the sensor 10, with respect to the stationary body 14, based on variations of the magnetic field due to the rotations themselves. Using a magnetic sensor prevents the rotating parts from contacting each other and therefore reduces wear.

Knowing the angular position of the pulley 3 enables, as discussed, to obtain the unwound amount of the cable 107 of the capstan 105. This information can be used in different ways.

First of all, it is possible to compensate the winding/unwinding of the cable caused by the shortening/lengthening of the extensions of the crane arms. Indeed, when the capstan is still, lengthening and shortening the arms of the crane causes an ascent/descent of the cable, possibly supporting loads. Therefore, it is possible, by acting on the motor of the capstan, to compensate this undirect movement of the cable. In this way, it is ensured a constant distance between the top of the crane and the load also in the presence of lengthening/shortening of the crane arms.

A further available function is the measurement of heights and depths, for example of buildings, bridges or hollows, by the amount of unwound cable.

Preferably, the sensor 10 comprises a wireless communication module, which can communicate with a control unit of the crane without requiring additional wires.

A person skilled in the art, in order to meet contingent specific needs, can introduce several additions, modifications, or substitutions of elements with other operatively equivalent elements to the described embodiments without falling out of the scope of the attached claims.

What is claimed is:

1. A device for supporting a cable of a capstan of a crane, comprising:
   a main supporting structure;
   a pulley rotatably supported by the main supporting structure, adapted to guide said cable of the capstan; and
   a sensor for measuring the angular position of the pulley, wherein the pulley comprises an auxiliary crown having a plurality of projecting elements disposed along the circumference thereof, and said sensor comprises a stationary body integral with the main supporting structure and a wheel, rotatable with respect to the stationary body, comprising a deformable crown which meshes with the auxiliary crown of the pulley and is made of a material such to deform due to the engagement of said projecting elements, wherein said sensor further comprises means for detecting the angular position of the wheel with respect to the stationary body of the sensor, wherein said deformable crown is made of an elastomeric material.

2. The device according to claim 1, wherein said wheel of the sensor comprises a circumferential groove and said deformable crown is removably inserted in said circumferential groove.

3. The device according to claim 1, wherein said deformable crown comprises an O-ring.

4. The device according to claim 1, wherein said projecting elements of the auxiliary crown of the pulley are made by knurling the surface of the same.

5. The device according to claim 1, wherein said main supporting structure comprises a first and a second plates delimiting a space wherein the pulley is received, said stationary body of the sensor being connected to the first plate.

6. The device according to claim 5, wherein the stationary body of the sensor is connected outside the first plate, said first plate comprising an opening such to enable to insert the wheel of the sensor in the space delimited by the first and second plates.

7. The device according to claim 1, wherein said wheel of the sensor comprises a shaft and a magnet inserted in a cavity of said shaft, the stationary body of the sensor comprising a detecting probe configured for determining the angular position of the wheel with respect to the stationary body of the sensor based on the variations of a magnetic field generated by the rotations of said magnet.

8. A crane comprising:
one or more arms comprising at least one extendable arm,
a capstan comprising a cable disposed along said one or more arms; and
a device supporting said cable of the capstan according to claim 1, positioned at an end of the outermost of said one or more arms.

* * * * *